United States Patent [19]

Kay

[11] 3,936,576

[45] Feb. 3, 1976

[54] RUBBER LAMINATES

[75] Inventor: Edward Leo Kay, Akron, Ohio

[73] Assignee: The Firestone Tire & Rubber Company, Akron, Ohio

[22] Filed: Aug. 12, 1974

[21] Appl. No.: 496,420

[52] U.S. Cl. ............... 428/424; 428/425; 428/492; 428/500; 156/110; 156/331; 260/77.5 R; 260/94.7 N; 260/768 R; 152/330 R

[51] Int. Cl.² ...................... B32B 27/40; B29H 5/02

[58] Field of Search ... 161/190; 260/77.5 R, 77.5 AR, 260/94.7 N, 768; 156/325, 331; 428/423, 424

[56] References Cited
UNITED STATES PATENTS

| | | | |
|---|---|---|---|
| 2,905,582 | 9/1959 | Coleman et al. | 161/190 X |
| 3,268,479 | 8/1966 | Martel | 260/77.5 R X |
| 3,425,886 | 2/1969 | Heins | 161/190 X |
| 3,542,639 | 11/1970 | Manino | 161/190 X |
| 3,648,748 | 3/1972 | Lovell | 161/190 X |

*Primary Examiner*—George F. Lesmes
*Assistant Examiner*—Alan T. McDonald

[57] ABSTRACT

The adhesive properties of compositions which contain an organic isocyanate, with or without a film-former, are improved by the inclusion of nitrosyl halide adducts of unsaturated compounds which act as adhesive promoters. The compositions are useful for adhering natural and synthetic polymeric elastomers, and are particularly useful in the production of laminations formed from polyurethane polymers and other substrates including metals, etc. and especially the formation of laminations from the cured tread of a conventional rubber to a curable polyurethane prepolymer composition which can be formed in the shape of a tire body.

8 Claims, 1 Drawing Figure

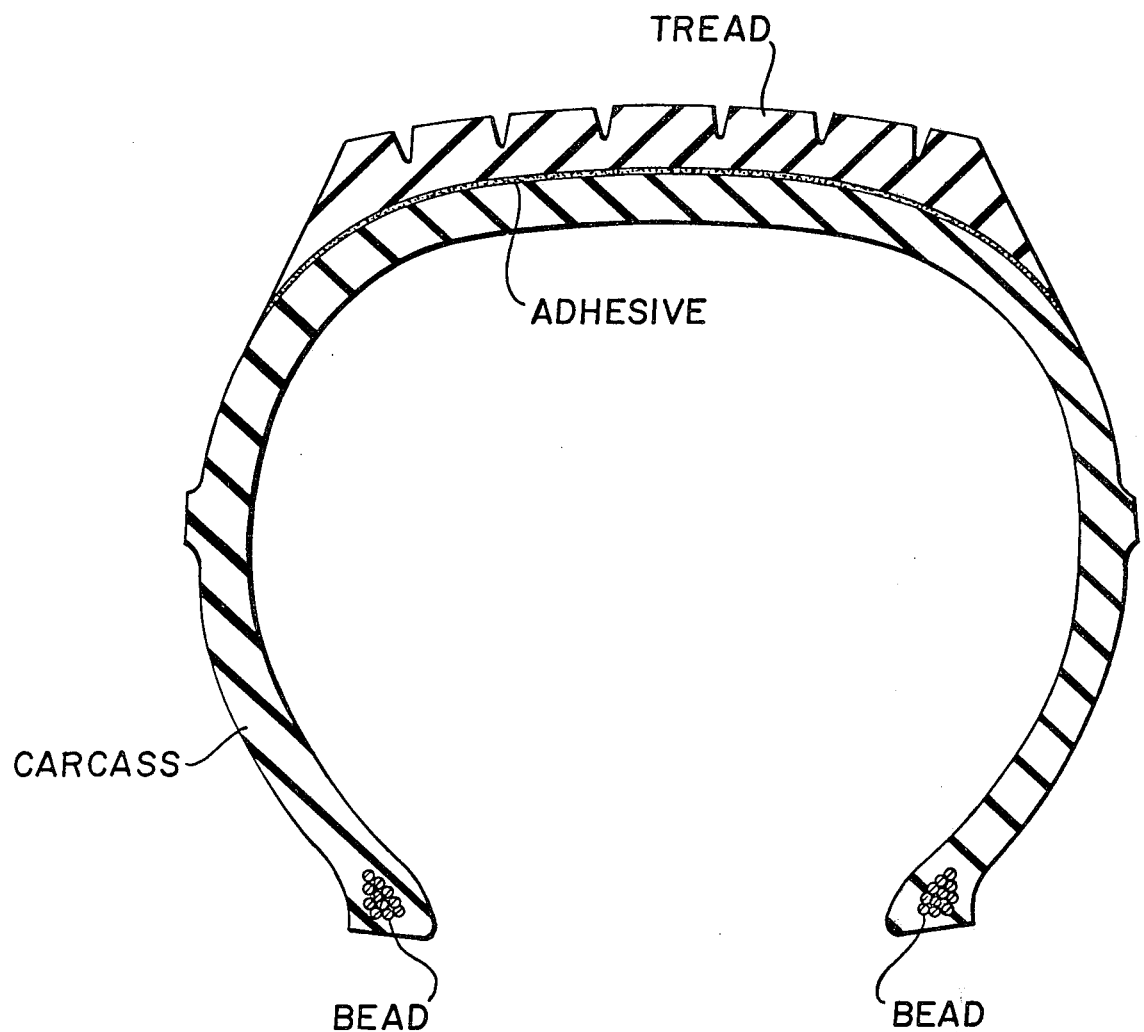

RUBBER LAMINATES

FIELD OF THE INVENTION

This invention relates to obtaining improved adhesion to polyurethane rubbers and olefinic rubbers and other substrates including metals, and pertains particularly to the adhesion of two substrates to one another in the production of tires and other laminations. By polyurethane rubbers are meant the rubbers produced by reaction of a polyisocyanate with a polymer such as a polyester or polyether or conjugated diene polymerized in such a manner as to have terminal functional groups. By olefinic rubbers are meant those rubbers containing olefinic unsaturation in their polymer chains such as natural rubber (NR), synthetic polyisoprene (IR), polybutadiene (BR), butadiene-isoprene copolymer (BI), rubbery copolymers of butadiene and styrene (SBR), rubbery copolymers of butadiene and acrylonitrile (NBR), rubbery copolymers of isoprene and isobutylene (IIR), polychloroprene (CR), ethylene-propylene rubbers (EPDM) and the like. This invention has particular use in applications where adhesive strength of a high degree is important as in the production of tires, belting, industrial rubber articles and like products composed of both polyurethane rubber and olefinic rubber components.

PRIOR ART

It is known from U.S. Pat. No. 2,905,583 that bonding of a polyurethane rubber to an olefinic rubber can be realized by interposing between such rubbers an adhesive including in combination an organic isocyanate and an aromatic compound containing at least one nitroso group attached directly to an aromatic ring carbon atom. The aromatic nitroso compounds contemplated by this patent are those wherein one or more of the molecular hydrogens of the aromatic nucleus is replaced by an alkyl, alkoxy, cycloalkyl, aryl, aralkyl, arylamine, arylnitrosoamine, halogen or like group. Oximes apparently are considered unsatisfactory by the patentees. The patent suggests that its adhesive compositions contain in addition to the described aromatic nitroso compounds and isocyanates, a so-called organic film-forming material such as a natural or synthetic elastomer or resin and it is further contemplated by the patent that tires be produced by adhering polyurethane rubber tread to an olefinic rubber body.

The present invention is clearly distinguished from the invention of that patent by the fact that the adhesion promoters utilized are derived from aliphatic (including cyclic aliphatic and heterocyclic aliphatic) compounds whereas the patent relates only to nitroso compounds with an aromatic nucleus.

SUMMARY OF THE INVENTION

The adhesive properties of a film-forming material and an organic isocyanate are improved by first mixing with the film-forming material and organic isocyanate, a solvent for these materials to which is added a nitrosyl halide adduct of an organic unsaturated compound. Alternatively, if an unsaturated rubber is used as the film-former, a nitrosyl halide adduct of the unsaturated rubber may be prepared and this adduct can be used in the adhesive formulations as both the film-former and adhesion promoter. Still another alternative is to apply a nitrosyl halide to the surface of a cured unsaturated rubber thereby effecting reaction of the nitrosyl halide with the unsaturated sites of the cured rubber and establishing a film of adhesion promoter on the surface of the cured rubber which can subsequently be bonded to a polyurethane rubber to form a lamination.

Most any polymeric material can be used as an organic film-former according to this invention. The primary function of the film-former, which may be a liquid or solid or a hot melt or a solid in solution in an organic solvent, is to modify the viscosity of the adhesive formulation so that it can be readily applied, as by brushing, troweling, spraying, etc. In effect, the film-former adds physical strength to the adhesion formulation so that the bonded substrates can be physically handled before final cure of the adhesive.

Olefinic elastomers such as natural rubber and synthetic rubber may be used as film-formers. The term "synthetic rubber" includes synthetic polyisoprene, polybutadiene, butadiene-styrene copolymers and block polymers, polyurethanes, butadiene-isoprene copolymers and block polymers, copolymers of isoprene-isobutene, polychloroprene, ethylenepropylene terpolymers and like piperylene homopolymers and copolymers and the like. The film-formers are not vulcanized. They may be solids or liquids of any practical molecular weight.

A polyurethane rubber may be based on a polyester or a polyether or a combination of the two. It may be based on a conjugated diene homopolymer or copolymer containing terminal functional groups. These elastomers and their prepolymers are also film-formers. Other film-formers include telechelic polymers and olefinic resins and the halogen-containing analogs of such materials and the foregoing natural and synthetic elastomers and condensation polymers including phenol-aldehyde and epoxy resins, polyamides, polyesters, etc. The film-former may be a halogenated wax.

Although toluene diisocyanate is generally used in the production of polyurethanes, other suitable isocyanates include phenylisocyanate, tolylisocyanate, xylene diisocyanate, cumene diisocyanate, methylenebis(p,p'-phenylisocyanate), methylenebis(p,p'-tolylisocyanate), methylenebis(p,p'-xylylisocyanate) and the like. Triisocyanates or higher will also function but are generally more expensive and less readily available on a commercial scale. Toluene diisocyanate is preferred on the basis of commercial availability. So-called blocked isocyanates which release the isocyanate at specified tempereatures will also function provided that the release temperature is lower than the cure temperature of the composite. Representative blocked isocyanates that may be used include phenol-blocked or caprolactam-blocked isocyanates. Dimeric isocyanates are also applicable. Organic isothiocyanates such as phenylisothiocyanate are also applicable. Another criterion for selection of an isocyanate is whether it would have a tendency to discolor the substrate. For example, Hylene W* is essentially non-staining and would be preferred on this basis.

*Methylenebis(4,4'-cyclohexylisocyanate) supplied by E. I. duPont de Nemours & Co., Inc.

Although toluene is used above as a solvent as a matter of convenience, hexane, cyclohexane, tetrahydrofuran, benzene, xylenes, dimethylformamide or many other common organic solvents as well as toluene are suitable. Any aprotic solvent should be effective. In case the adhesion promoter is liquid, the solvent may be deleted.

The exact concentrations of the film-former, adhesion promoter and isocyanate will depend on the strength of the adhesive bond desired in the final product. Generally, concentrations are selected to obtain optimum adhesion desired for a specific application. In addition, the concentrations are also adjusted to obtain a correct viscosity; that is, if the formulation is to be sprayed, the viscosity should be low, if brushed or dipped an intermediate viscosity would be desired. If the adhesive is to be troweled onto the surface, a higher viscosity is desired. As a guide, suitable concentrations of film-former, adhesion promoter and isocyanate on a solventfree basis normally fall within the following ranges:

|  | Parts by Weight |
|---|---|
| Film-Former | 0 – 90 |
| Adhesion Promoter | 0 – 60 |
| Isocyanate | 1 – 95 |

NITROSYL HALIDE ADDUCTS

The reaction of nitrosyl halides with simple olefins to form adducts is well known and can be illustrated by the following general formula:

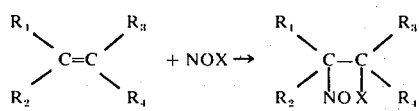

However, the reaction of nitrosyl halide with unsaturated polymers is relatively complicated in that the initial reaction is believed to be the addition of the nitrosyl halide to the unsaturated sites on the backbone of the polymer. The reaction may be illustrated as follows, using as a model polymer a cis-1,4-polybutadiene:

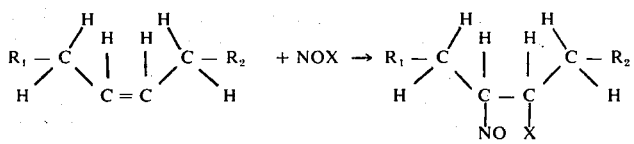

Formula I

Complications occur relative to the exact chemical structure of the final product in that in the case of a cis-1,4-polybutadiene, the nitroso function could be tautomeric with the oxime function, e.g.

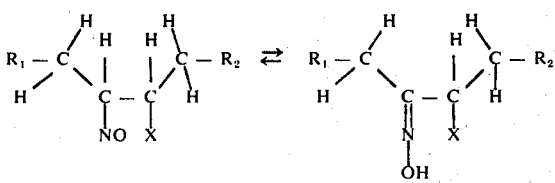

Formula II

Moreover, the usual commercial polymers do not contain exclusively a single microstructure. For example, commercial synthetic polybutadiene usually contains significant amounts of cis-1,4, trans-1,4 and 1,2- structures. Synthetic commercial polyisoprene contains significant amounts of cis-1,4; trans-1,4; 1,2- and 3,4-structures. Therefore, it is not realistic to indicate a specific reaction of a nitrosyl halide with the film-forming elastomers of this invention. It must suffice to state that treatment of an elastomeric material with a nitrosyl halide to the extent of about 1 to 50 weight percent incorporation of nitrosyl halide, etc. results in a film former product with significantly improved adhesion properties. The preferred halonitrosated polymer includes 1 to 25% incorporation of nitrosyl halide, etc. If more than 50 weight per cent is incorporated, there is a tendency for the polymer to cross link.

As stated previously, nitrosyl halides can also be applied to the surface of vulcanized conventional rubbers to form a nitrosated surface which will function in a manner to improve adhesion. In this case, the nitrosyl halides react with the unsaturated or activated sites on the surface of the cured rubber. It is particularly difficult to illustrate this reaction by a simple equation because the exact microstructures present in vulcanized rubber have not been completely and accurately defined. However, it is well known that most rubbers contain unsaturated sites or activated sites (e.g., allylic positions) which will react with reactive chemicals such as oxygen, ozone, halogens, and in this case, nitrosyl halides.

It will be obvious to one skilled in the art that many combinations of monomeric materials are possibile to form polymers with some unsaturation in the molecule and these unsaturated sites can react with the nitrosating agents herein listed.

Nitrosyl halides, etc. useful in the practice of the invention include nitrosyl chloride, nitrosyl bromide, nitrosyl bromide-bromine complex and nitrosyl fluoborate, and the following reactants are included herein which produce effective promoters, nitroso acid sulfate and nitroso sulfate and the like. Generally, any nitrosating agent that adds NO and the associated anion to adjacent carbon atoms may be used.

PREPARATION OF NITROSYL HALIDE ADDUCTS

The nitrosyl halide, etc. adducts are relatively easily prepared by simply mixing an olefinic substrate with a nitrosyl halide. The preferred adducts are nitrosyl chloride adducts and the description will refer to the chloride adducts more particularly. It is understood that the bromide adducts may be prepared in a similar manner and used similarly. Nitrosyl fluoride is a known compound which might be used but it is expensive and its use may involve health complications.

A solvent inert to the nitrosyl chloride may be utilized or, in the case of treating a liquid olefin, the olefin may be used as both reactant and solvent. The olefin may be mono-, di- or poly-functional. The saturation may be isolated (R—C=C—R'), conjugated (R—C=\\ C—C=C—R') or cumulative (R—C=C=C—R'). The olefinic compound may be liquid or solid and may contain two to about 66 carbon atoms. Nitrosyl halide adducts of commercial uncured elastomer may function as both adhesion promoter and film-former. The molecular weight of the elastomers may be that of commercial elastomers.

The adducts of the invention may be illustrated by the following generalized formula:

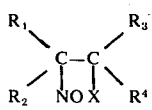

Formula III wherein $R_1$, $R_2$, $R_3$ and $R_4$ are hydrogen atoms, hydrocarbyl groups or halogen atoms or any combination thereof. The adducts should be soluble in a usual organic solvent (e.g. hexane, toluene, benzene, tetrahydrofuran, etc.). In addition, the adduct should have sufficient molecular weight or polarity for practical use relative to volatility, in order that the promoter is retained in the adhesive formulation. The NO in the formula is a nitroso function derived from a nitrosyl halide (NOX). The symbol X in the formula is used to designate the halogen derived from the nitrosyl halide. It will be obvious to one skilled in the art, that other such nitrosating agents would function as disclosed.

Again, referring to the generalized Formula III, the nitroso function is known to be tautomeric with an oxime function if either or both $R_1$ and $R_2$ are hydrogen atoms. If neither $R_1$ nor $R_2$ is a hydrogen atom, the nitroso function is as shown and according to this invention, functions as such.

Any of the $R_1$, $R_2$, $R_3$ and $R_4$ groups which is hydrocarbyl may contain from one to about 16 carbon atoms. The carbon atoms may be arranged in a linear, branched saturated or unsaturated configuration. The hydrocarbyl carbon atoms may also be arranged in a cyclic or aromatic configuration or any combination of these configurations.

The hydrocarbyl groups may also contain halogen substituents, chlorine being preferred. They may also contain hetero atoms such as oxygen, sulfur or nitrogen between the carbon atoms.

Representative nitrosyl halide adducts of the invention include:
1-chloro-2-nitrosoethane,
1-bromo-2-nitrosoethane,
1,1,2-trichloro-1-nitrosoethane,
1,1,2-trichloro-2-nitrosoethane,
1,1,2,2-tetrachloronitrosoethane,
1-chloro-2-nitrosopropane,
1-bromo-2-nitrosopropane,
1-chloro-2-nitroso-isobutane,
1-bromo-2-nitroso-isobutane,
2-chloro-3-nitroso-butane,
2-bromo-3-nitroso-butane,
2-chloro-2-methyl-3-nitrosobutane and
2-bromo-2-methyl-3-nitrosobutane
which illustrate compounds in which $R_1$, $R_2$, $R_3$ and $R_4$ are hydrogen atoms, simple alkyl groups or halogen atoms.

Illustrative of adducts containing higher alkyl groups are:
1-chloro-2-nitrosohexane,
1-bromo-2-nitrosohexane,
1-chloro-2-nitroso-2-butylhexane,
1-bromo-2-nitroso-2-butylhexane,
1-nitroso-1,1,2,2,2-penta chloroethane,
1-nitroso-1,1,2,2-tetrachloro-2-bromoethane,
1-nitrosoperchloropropane,
1-nitrosoperchlorobutane,
1-nitrosoperchloroisobutane, etc.

Adducts containing branched-chain alkyl groups include:
1-chloro-2-nitroso-3-methylbutane,
1-bromo-2-nitroso-3-methylbutane,
3-chloro-4-nitroso-2,5-dimethylhexane,
3-bromo-4-nitroso-2,5-dimethylhexane,
1-nitroso-2-chloro-1,1,2,2-tetrahexadecylethane,
1-nitroso-2-bromo-1,1,2,2-tetrahexadecylethane, etc.

Illustrative of linear unsaturated derivatives are:
1-chloro-2-nitrosobutene-3,
1-bromo-2-nitrosobutene-3,
3-chloro-4-nitrosohexadiene-1,5, etc.

It will be apparent that linear unsaturated derivatives such as those illustrated by the foregoing examples may be prepared by the addition of nitrosyl chloride or bromide to a conjugated diene or triene. In conjugated systems, the nitrosyl halide adduct may be prepared by a 1,2- or 1,4- addition.

Thus, the reaction of nitrosyl chloride with butadiene, the simplist conjugated system, would result in the following compounds: 1-chloro-2-nitrosobutene-3 or 1-nitroso-2-chlorobutene-3 depending on whether a peroxide is present in the reaction mixture. In addition, cis and trans 1-chloro-4-nitrosobutene-2 will form. Similar products would also form with isoprene, piperylene, 2,3-dimethylbutadiene, cyclopentadiene, dicyclopentadiene, cyclooctadiene-1,3, cyclododecatriene-1,3,5, etc.

The reactions of nitrosyl chloride with cumulative double bonds is a bit speculative in that the initial reaction products tend to isomerize. Therefore, no one chemical equation would accurately describe the reactions.

Illustrative of cyclic aliphatic derivatives are:
2-nitrosochlorocyclohexane,
1,2-dichloronitrosocyclohexane,
2-nitrosobromocyclohexane,
2-nitrosochlorocyclopentane,
2-nitrosobromocyclopentane, etc.
and of aromatic-alkyl derivatives are:
1-phenyl-1-nitroso-2-chloroethane,
1-phenyl-1-nitroso-2-bromoethane,
1,1-diphenyl-1-nitroso-2-chloroethane,
1,1-diphenyl-1-nitroso-2-bromoethane, etc.

Illustrative of compounds in which the hydrocarbyl group contains halogen substituents are:
1-nitroso-2,4-dichloropentane,
1-nitroso-2-chloro-4-bromopentane,
1-nitroso-2-bromo-4-chloropentane,
1-nitroso-2-bromo-4-bromopentane, etc.

Illustrative of nitrosyl halide adducts of heterocyclic compounds are:
2-chloro-3-nitrosofuran,
2-bromo-3-nitrosofuran,
2-chloro-3-nitrosothiophene,
2-bromo-3-nitrosothiophene,
2-chloro-3-nitrosopyrrole,
2-bromo-3-nitrosopyrrole, etc.

EXPERIMENTAL

The NOCl adducts of hydrocarbyl olefins may be prepared from a solution of the olefin in a suitable solvent cooled to about 25° to −40° C. To the cold solution of olefin is added slowly a solution of NOCl, usually in the same solvent used for the olefin while maintaining the reaction temperature at about 25° to −40° C. with good agitation. After complete addition of the NOCl solution, the reaction is allowed to slowly warm to ambient temperature and the mixture is stirred usually for an additional few hours to complete the reaction.

In some cases in which the hydrocarbyl olefin is sterically hindered, it is desirable to use a catalyst to increase the reaction rate. Usually anhydrous gaseous hydrogen chloride or aluminum chloride is used.

When hydrogen chloride is used, the gas is simply continuously sparged through the reaction mixture. When aluminum chloride is used as a catalyst, the aluminum chloride is usually first dissolved in the NOCl and the solution added to the reaction mixture.

The chloronitrosated hydrocarbyl olefins are recovered by conventional techniques. For example, if the product is a solid, insoluble in the solvent, the product is isolated by filtration. If the reaction product is soluble, the reaction mixture is usually filtered and the solvent removed under vacuum to recover the reaction product.

Data in Table I summarize pertinent information on typical reactions of NOCl with hydrocarbyl olefins. It should be pointed out that the product designated is the expected major product and these reaction products were used as adhesion promoters without exhaustive purification. This procedure was followed because it was felt the product obtained by the indicated procedure would be representative of commerical production of the NOCl adduct. Exhaustive purifications were not conducted since this procedure would be very expensive on a commercial scale.

20 to 30 minutes at about 300° F.). The cured olefinic rubber sheet was buffed to a satiny finish on the side opposite the tire fabric, the buffed surface being then washed with acetone or white gasoline. A 2 inch by 6 inch portion of the buffed surface was covered with holland cloth, the holland cloth being securely taped down on all four edges to prevent adhesion and facilitate subsequent testing in an Instron tester. The exposed buffed surface of the cured olefinic rubber sheet was coated with the adhesive cement of the invention being tested and allowed to dry. The olefinic rubber sheet was then placed in the bottom of a 6 inch by 6 inch by 0.250 inch mold with the adhesive-cement-coated surface up. A curable liquid polyurethane rubber compound was poured into the mold in a sufficient quantity to fill the mold. After the polyurethane material had gelled a 6 inch by 6 inch piece of square woven nylon was placed on the surface of the polyurethane to prevent direct contact with the hot mold during subsequent complete curing. A cover plate was placed on the top of the mold and the mold was heated 3 hours at 212° F. to complete the curing of the polyurethane rubber. Flashing was trimmed from the resulting test lamination and the edge containing the holland cloth was cut back to expose the cloth to initiate separation of the two substrates. One inch wide test strips were cut from the lamination in a direction parallel to the direction of the reinforcing tire cord. After 24 hours at room temperature, test results were obtained by clamping the free ends of a given test strip to the jaws of a testing machine and the jaws of the test machine were pulled apart at a rate of 2 inches per minute, the force in pounds per inch at tear as well as the nature of the tear being observed. With regard to the nature of the adhesion, the terms "Pad Tear" and "Rubber Tear", as they may appear hereafter have the following meanings.

TABLE I

SUMMARY PREPARATION OF NOCl ADDUCTS

| Olefin | Reactants Moles | NOCl Moles | Catalyst | Solvent | Temp. °C. | Time Hrs. | Product | Yield Mole % | Character |
|---|---|---|---|---|---|---|---|---|---|
| cyclohexene | 0.6 | 0.65 | HCl | Pet. Ether | =35 | 1 | 2-nitrosochlorocyclohexane | 40% | blue oil |
| cyclohexene | 1.0 | 2.0 | — | Hexane | −40 | 2 | 1,2-dichloronitrosocyclohexane | 52% | blue oil |
| 1,1-dichloroethylene | 0.3 | 0.22 | AlCl$_3$ | — | — | — | 1,1,2-trichloro-1-nitrosoethane | 88% | blue oil |
| 1,2-dichloroethylene | 0.2 | 0.2 | AlCl$_3$ | — | 25 | 72 | 1,2,2-trichloro-1-nitrosoethane | 50% | green oil |
| 1,1,2-trichloroethylene | 0.45 | 0.52 | AlCl$_3$ | — | 25 | 96 | 1,1,2,2-tetrachloronitrosoethane | 38% | green oil |
| dicyclopentadiene | 0.25 | 0.50 | — | Chlorobenzene | −30 / 25 | 1 / 24 | mono and diadduct | 45.5%** / 45%** | white solid / green oil |
| dicyclopentadiene | 0.25 | 0.50 | HCl | CCl$_4$ | −20 | 1 | mono adduct | 100% | white solid |
| polybutadiene | 100 gms | 20 gms | HCl | Pet. Ether | −30 | — | chloronitrosated polybutadiene | — | * |
| polybutadiene | 100 gms | 20 gms | — | Chlorobenzene | −30 | — | chloronitrosated polybutadiene | — | * |

*Reaction product was dissolved in toluene to prepare a 50% solution for use as an adhesive component.
**weight percent yield

ADHESION TESTS

The adhesion test results reported hereafter were obtained on laminations of olefinic rubber and polyurethane rubber, a cement of the film-former (if used), an organic isocyanate and a promoter prepared in accordance with the invention having been interposed between the two rubbers. The procedure was as follows:

First, a sheet 6 inches square and 0.100 inch thick was prepared from vulcanizable olefinic rubber compound. One side of the olefinic rubber sheet was backed with reinforcing nylon tire fabric treated for adhesion. This sheet was cured (usually on the order of "Pad Tear" means that the tear was along the nylon fabric. "Rubber Tear" means that the tear was in the olefinic rubber. Where the percentage of tear reported hereafter is less than 100%, the balance was tear along the adhesive interface. For elevated temperature testing as reported in the table, the test samples were placed in an oven maintained at the desired elevated temperature. Each test sample was then removed after being in the oven a total of 15 minutes and immediately subjected to the pulling test.

The following examples illustrate practice of the invention. In the examples the vulcanizable olefinic rubber sheets employed were prepared of the following formulation:

| | Parts by Weight |
|---|---|
| SBR | 60.0 |
| Polybutadiene | 40.0 |
| Carbon Black | 70.0 |
| Oil | 44.0 |
| Zinc Oxide | 2.0 |
| Stearic Acid | 2.0 |
| Wax | 3.0 |
| Sulfur | 1.7 |
| Accelerator | 1.2 |
| Antioxidant | 1.0 |

Following the procedure above outlined, such sheets were backed with nylon fabric as previously described, cured, buffed and one surface coated by brushing with a cement containing the adhesion promoter of the invention. The adhesive coated sheets were in each instance formed into a lamination by the abovedescribed proceudre with a polyurethane rubber composition of the following formulation:

| | Parts by Weight |
|---|---|
| Adiprene L-167* | 100.0 |
| Silicone DC-200** | 0.10 |
| Methylene bis-(o-chloro-p-aniline) | 20.98 |
| Dioctyl phthalate | 20.00 |

*A reaction product of a diisocyanate and a polyalkylene ether glycol, supplied by E. I. duPont de Nemours & Co., Inc.
**A silicone oil supplied by Dow Corning Corporation.

The data recorded under Experiment Nos. 1 through 5 of that table were obtained by the general procedures previously described. In Experiment Nos. 6 and 7, nitrosyl chloride was used directly as an adhesion promoter to bond a cured olefinic rubber (Exp. No. 6) and cured EPDM rubber (Exp. No. 7) to a cured polyurethane. No film-former was used in Experiment Nos. 6 and 7 to verify that the film-former was optional in carrying out the invention. The technique used was to brush the benzene solution of nitrosyl chloride onto the cured olefinic rubber and cured EPDM rubber, allow the benzene and excess nitrosyl chloride to slowly evaporate and then apply a thin coat of toluene diisocyanate. Adhesion pads were then constructed by the general procedure described previously.

As indicated by the adhesive strength values recorded in Table II, all of the adhesive formulations in Experiment Nos. 1 through 7 resulted in strong bond strengths at ambient temperature (72° F.) as well as at the elevated temperatures (212° F., 250° F. and 300° F.), whereas the control samples were too weak to give recordable values. As expected, the bond strengths decreased as the test temperature increased; however, all of the bond strengths obtained at the elevated temperatures are considered good and indicate that the laminations produced could be used for many industrial applications requiring use at moderately elevated temperatures.

The surface appearance of the ruptured lamination as recorded in Table I under the column labeled "Na-

TABLE II

EVALUATION OF EXPERIMENTAL ADHESIVE FORMULATIONS
Weight % Composition

| | | Control | Experiment No.: 1 | 2 | 3 | 4 | 5 | 6 | 7 |
|---|---|---|---|---|---|---|---|---|---|
| Adiprene L-167 | | — | 36.35 | 36.35 | 20.0 | 18.2 | 33.3 | — | — |
| Toluene Diisocyanate | | * | 18.2 | 18.2 | 40.0 | 36.35 | 16.7 | ** | ** |
| Toluene | | — | 36.35 | 36.35 | 20.0 | 36.35 | 33.3 | — | — |
| Adhesion Promoter | A | — | 9.1 | — | — | — | — | — | — |
| " | B | — | — | 9.1 | — | — | — | — | — |
| " | C | — | — | — | 20.0 | — | — | — | — |
| " | D | — | — | — | — | 9.1 | — | — | — |
| " | E | — | — | — | — | — | 16.7 | — | — |
| " | F | — | — | — | — | — | — | ** | ** |
| Adhesive Strength Lbs./Inch at: | | | | | | | | | |
| 72° F. | | Too | 94 | 78 | 72 | 69 | 73 | 90 | 40 |
| 212° F. | | weak | 39 | 41 | 41 | 42 | 41 | 33 | 21 |
| 250° F. | | to | 32 | 32 | 24 | 25 | 30 | 15 | 21 |
| 300° F. | | test. | 10 | 12 | 15 | 6 | 7 | — | — |
| Nature of Adhesion at: | | | | | | | | | |
| 72° F. | | Too | 100% Pad | 100% Rubber | 100% Rubber | 100% Rubber | 100% Rubber | — | — |
| 212° F. | | weak | " | " | " Pad & Rubber | 95% " | " Pad | — | — |
| 250° F. | | to | " | " | " | 85% Pad | " | — | — |
| 300° F. | | test. | 2% Rubber | 20% | " | 2% Rubber | 30% Rubber | — | — |

*In the control, no film-former or promoter was used. The general procedure for preparing test pads was the same in Experiments No. 1 through 7. The olefin rubber substrate of the control was brushed with toluene diisocyanate, and the upper polyurethane rubber composition was pressed on to it. The polyurethane rubber composition contained Adiprene L-167 which was used as a film-former in Experiment Nos. 1 through 5 so that as far as the reactive chemical species are concerned, the control was the same as the composition of Experiment Nos. 1 through 5. The adhesion produced in the control was so poor that the two substrates were separated at the interface when pulled apart by hand at 72° F.
Adiprene L-167, defined above, (supplied by E. I. duPont de Nemours & Co., Inc.) functions as a film-former.
Adhesion Promoter A is 1,1,2,2-tetrachloronitroso ethane.
Adhesion Promoter B is 2-nitrosochlorocyclohexane which can be tautomeric with 2-chlorocyclohexanone oxime.
Adhesion Promoter C is the mono-nitrosylchloride adduct of dicyclopentadiene.
Adhesion Promoter D is the di-nitrosylchloride adduct of dicyclopentadiene.
Adhesion Promoter E is a 50 weight per cent solution of nitrosyl chloride treated polybutadiene in toluene.
**Adhesion Promoter F is a benzene solution of nitrosyl chloride containing 13.5 weight per cent nitrosyl chloride. This solution was applied to the surface of vulcanized olefinic rubber previously described as well as a cured EPDM rubber. Adhesive bond strengths obtained with the vulcanized olefinic rubber are recorded under Experiment No. 6 and those with the cured EPDM rubber are listed under Experiment No. 7.
The preparation of Promoters A to D is described in Table I and the descriptive matter which precedes it.

To demonstrate the utility of the adhesive promoters of this invention, the promoters were formulated with a film-former (Adiprene L-167), toluene diisocyanate and toluene. The exact compositions of their formulations are summarized in Table II.

ture of Adhesion at:" is of practical importance. It should be noted that in no case was the rupture of the lamination due exclusively to failure in the adhesive phase alone. This means that if the substrates, either the vulcanized olefinic rubber or polyurethane, could be improved relative to tear strength, the adhesive bond strength values would have been higher than observed. In other words, the laminations ruptured at the weakest point which is demonstrated as not being in the adhesive phase.

As shown by the results reported in the above examples, excellent adhesion is obtained by the use of cements containing the adhesion promoters of the invention. Such cements without the adhesion promoters of the invention are not effective adhesives.

A particularly desirable application of the adhesive of the inventiton involves the adhesion of olefinic rubber tire treads to polyurethane rubber tire bodies and conversely in adhering polyurethane rubber tire treads to olefinic rubber tire bodies. This is illustrated in the Figure. Since good adhesion results are obtained using a film-former based on either a polyether or a polyester or conjugated diene polymerized in such a manner as to form terminal groups, good adhesion to either an olefinic rubber or a polyurethane rubber to polyesters also is obtained by the adhesives of the invention.

For instance, the adhesive composition in such instances may be applied to the cured substrates or one or both of the substrates may be curable. If one substrate, for example the polyurethane carcass, or both substrates, are curable, the adhesive composition and the uncured substrate or substrates will be cured simultaneously. The curable adhesive is applied between the substrates and then the tire will be heated to cure the adhesive, and one or both substrates may be cured simultaneously with it. The adhesive may be cured by heating for 3 hours at 212° F. as disclosed above, and may be cured at this temperature with a curable polyurethane carcass. If it is cured with the olefinic rubber composition, it may be cured for 20–30 minutes at about 300° F. as disclosed above. Any cure conditions consistent with what is known in the art may be employed. The adhesive composition may be cast or brushed or otherwise applied to one or both substrates, which may be either cured or partially or completely precured. For instance, it may be cast on to the tread and this coated tread may then be wrapped around the cured or curable carcass which may be composed of polyurethane rubber and the assembly will then be heated to cure the adhesive and complete the curing of one or both of the substrates which had not been previously completely cured. Alternatively, the adhesive may be applied to the carcass and then the tread will be applied to it.

A further application of the invention involves treatment of rubber articles with the adhesive formulations of the invention as a means of priming the surface for painting with a urethane based paint or with an acrylate based paint.

In the claims, the word "tire" is to be construed generally as meaning an ordinary pneumatic tire, although the tire may be a solid tire, such as a foam-filled tire or a solid rubber tire. Furthermore, it may be a self-supporting structure of the general shape of a pneumatic tire which does not require inflation by super-atmospheric pressure.

We claim:

1. A lamination of two rubber substrates adhered by the cured adhesive composition of an organic isocyanate and an adhesion promoter of the class consisting of 2-chlorocyclohexanone oxime, mono or di-nitrosylchloride adduct of dicyclopentadiene in the oxime form and a substantially 16.5-weight per cent nitrosyl chloride adduct of polybutadiene in the oxime form.

2. The lamination of claim 1 in which the promoter is 2-chlorocyclohexanone oxime.

3. The lamination of claim 1 in which the promoter is mono or di-nitrosylchloride adduct of dicyclopentadiene in the oxime form.

4. The lamination of claim 1 in which the promoter is a substantially 16.5-weight per cent nitrosyl chloride adduct of polybutadiene in the oxime form.

5. The lamination of claim 2 in which one of the substrates is a polyurethane.

6. The lamination of claim 1 in which one of the substrates is a polyurethane.

7. The lamination of claim 3 in which one of the substrates is a polyurethane.

8. The lamination of claim 4 in which one of the substrates is a polyurethane.

* * * * *

UNITED STATES PATENT OFFICE
CERTIFICATE OF CORRECTION

Patent No. 3,936,576          Dated Feb. 3, 1976

Inventor(s) Edward Leo Kay

It is certified that error appears in the above-identified patent and that said Letters Patent are hereby corrected as shown below:

Col. 3 - In line 13 before "basis", change "solventfree" to read -- solvent-free --.

Col. 4 - In line 64 after "the" change "saturation" to read -- unsaturation --, and in lines 65 and 66 change "(R-C=λ C-C=C-R')" to read -- (R-C=C-C=R') --.

Col. 7 - In TABLE I the temperature in degrees centigrade corresponding to cyclohexene should be -- -35 -- instead of "=35".

Col. 9 - In lines 19 and 20 "abovedescribed proceudre" should read -- above-described procedure --, and in the last line of TABLE II under "Experiment No. 2" ditto marks should be inserted immediately to the right of "20%".

Col. 10 - In TABLE II under "Experiment No. 7" the "Adhesive Strength Lbs./Inch at 250 F." should be -- 27 -- instead of "21".

Col. 11 - In line 12 before "involves" the word "inventiton" should read -- invention -- .

Signed and Sealed this

Twenty-eighth Day of September 1976

[SEAL]

Attest:

RUTH C. MASON
Attesting Officer

C. MARSHALL DANN
Commissioner of Patents and Trademarks